(12) United States Patent
Kitora

(10) Patent No.: US 7,551,753 B2
(45) Date of Patent: Jun. 23, 2009

(54) IMAGE PROCESSING APPARATUS AND METHOD THEREFOR

(75) Inventor: Masakazu Kitora, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 641 days.

(21) Appl. No.: 11/286,390

(22) Filed: Nov. 25, 2005

(65) Prior Publication Data

US 2006/0114484 A1 Jun. 1, 2006

(30) Foreign Application Priority Data

Nov. 30, 2004 (JP) ............................... 2004-347236

(51) Int. Cl.
*G06K 9/00* (2006.01)
*G06F 3/12* (2006.01)
*G04N 1/40* (2006.01)
(52) U.S. Cl. ........................ 382/100; 358/1.13; 358/448
(58) Field of Classification Search .................. 382/100, 382/125, 162, 168, 190, 198, 276, 307; 358/1.13, 358/1.14, 1.15, 1.18, 3.23, 448, 462, 530; 701/28
See application file for complete search history.

(56) References Cited

U.S. PATENT DOCUMENTS 5,949,555 A * 9/1999 Sakai et al. .................. 358/462

6,466,329 B1 * 10/2002 Mukai ........................ 358/1.15
2006/0170952 A1 8/2006 Hamada et al. ............. 358/1.14

FOREIGN PATENT DOCUMENTS

JP 10-285378 10/1998
JP 2001-358863 12/2001

* cited by examiner

*Primary Examiner*—Abolfazl Tabatabai
(74) *Attorney, Agent, or Firm*—Fitzpatrick, Cella, Harper & Scinto

(57) ABSTRACT

When a document image printed by freely editing and processing image data is to be copied, the user may want to copy the edited/processed image or copy an original image before editing and processing. To meet this demand, a document image is input, and pointer information for specifying the storage location of an original image, and image process information representing whether the input image is attained by editing and processing the original image are extracted from the input image. Priority data information representing which of the input image and original image is used is obtained. When no pointer information is extracted, when the image process information represents that the original image has not been edited or processed, or when the priority data information represents the use of the input image, the input image data is converted into vector data. When the pointer information is extracted, the image process information represents that the original image has been edited and processed, and the priority data information represents the use of the original image, the original image is input on the basis of the pointer information, and an image is formed on the basis of the vector data or original image.

20 Claims, 15 Drawing Sheets

FIG. 4A

PRESS RELEASE

XXXXXXXXXXXXXXXXXX XXXXXXXXXXXXXXXXXX
XXXXXXXXXXXXXXXXXX XXXXXXXXXXXXXXXXXX
XXXXXXXXXXXXXXXXXX XXXXXXXXXXXXXXXXXX
XXXXXXXXXXXXXXXXXX XXXXXXXXXXXXXXXXXX
XXXXXXXXXXXXXXXXXX XXXXXXXXXXXXXXXXXX
XXXXXXXXXXXXXXXXXX XXXXXXXXXXXXXXXXXX
XXXXXXXXXXXXXXXXXX XXXXXXXXXXXXXXXXXX
XXXXXXXXXXXXXXXXXX XXXXXXXXXXXXXXXXXX
XXXXXXXXXXXXXXXXXX XXXXXXXX

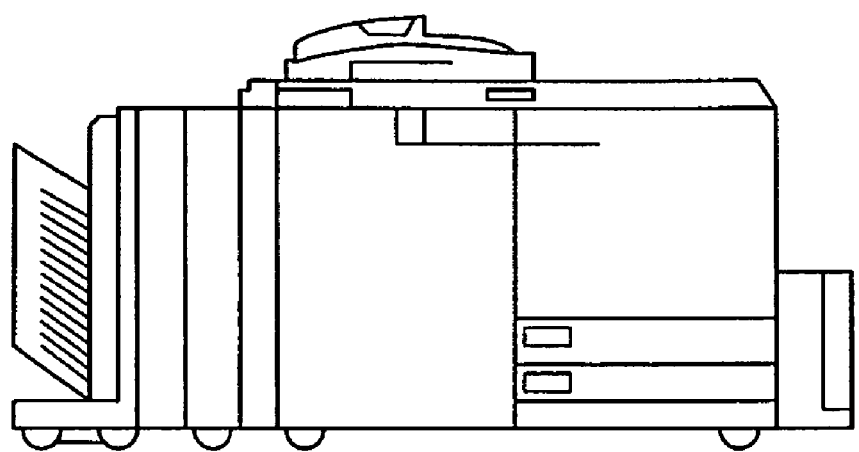

FIG. 5
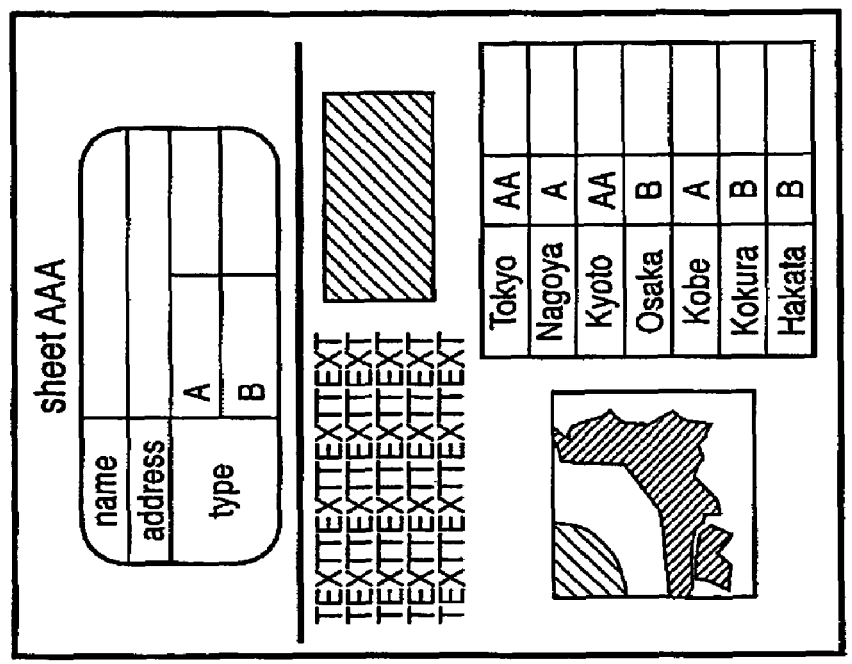
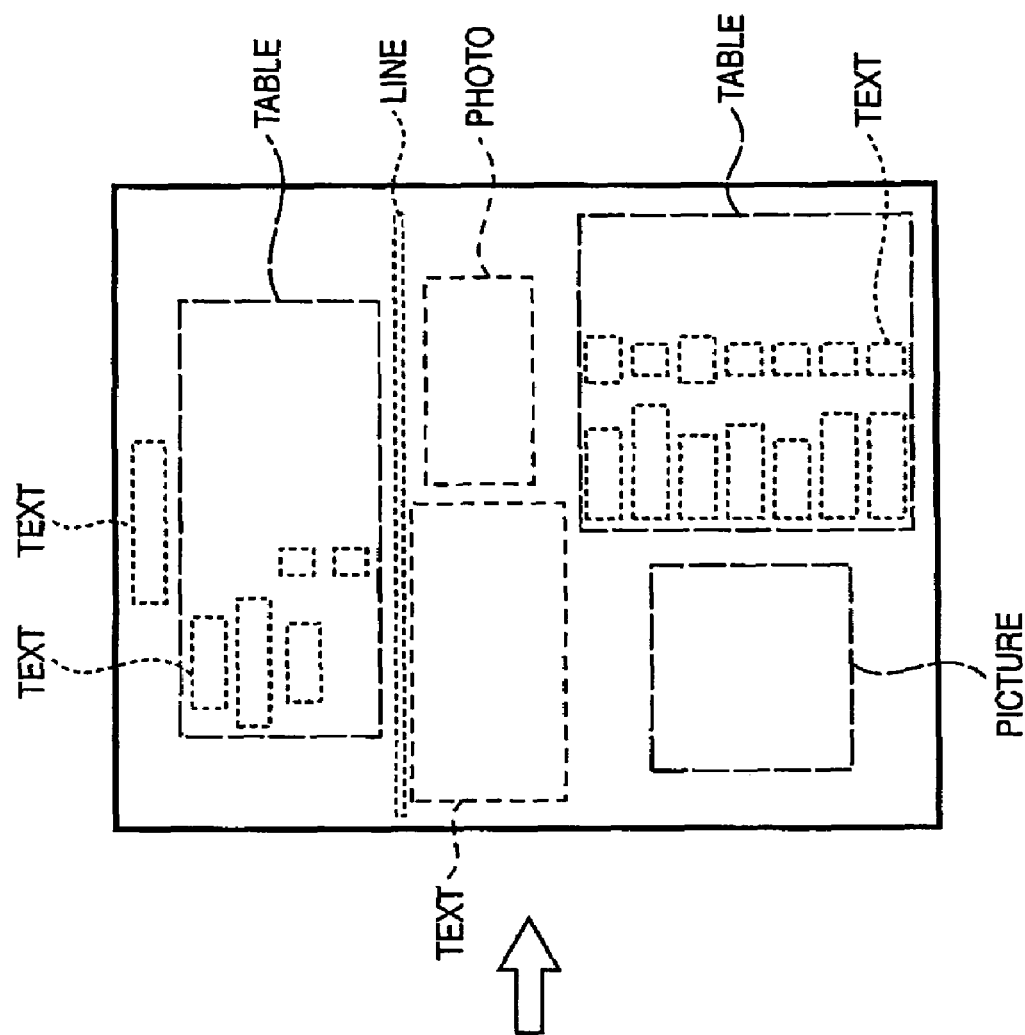

FIG. 6A

BLOCK INFORMATION

| | ATTRIBUTE | COORDINATE X | COORDINATE Y | WIDTH W | HEIGHT H | OCR INFORMATION |
|---|---|---|---|---|---|---|
| BLOCK 1 | 1 | X1 | Y1 | W1 | H1 | AVAILABLE |
| BLOCK 2 | 3 | X2 | Y2 | W2 | H2 | AVAILABLE |
| BLOCK 3 | 2 | X3 | Y3 | W3 | H3 | NOT AVAILABLE |
| BLOCK 4 | 1 | X4 | Y4 | W4 | H4 | AVAILABLE |
| BLOCK 5 | 3 | X5 | Y5 | W5 | H5 | AVAILABLE |
| BLOCK 6 | 5 | X6 | Y6 | W6 | H6 | NOT AVAILABLE |

*ATTRIBUTE  1:TEXT  2:PICTURE  3:TABLE  4:LINE  5:PHOTO

FIG. 6B

INPUT FILE INFORMATION

| TOTAL NUMBER OF BLOCKS | N(=6) |
|---|---|

F I G. 9
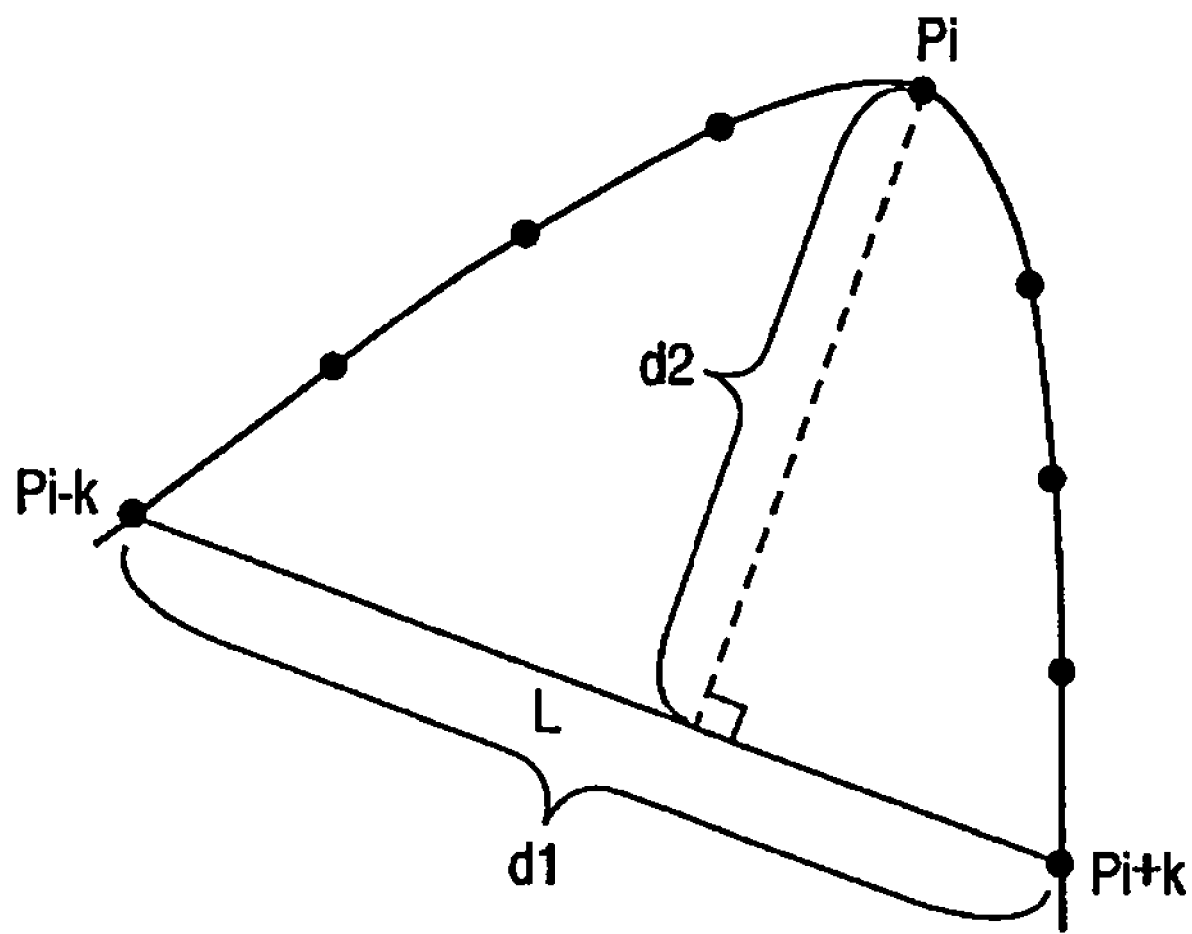

F I G. 11
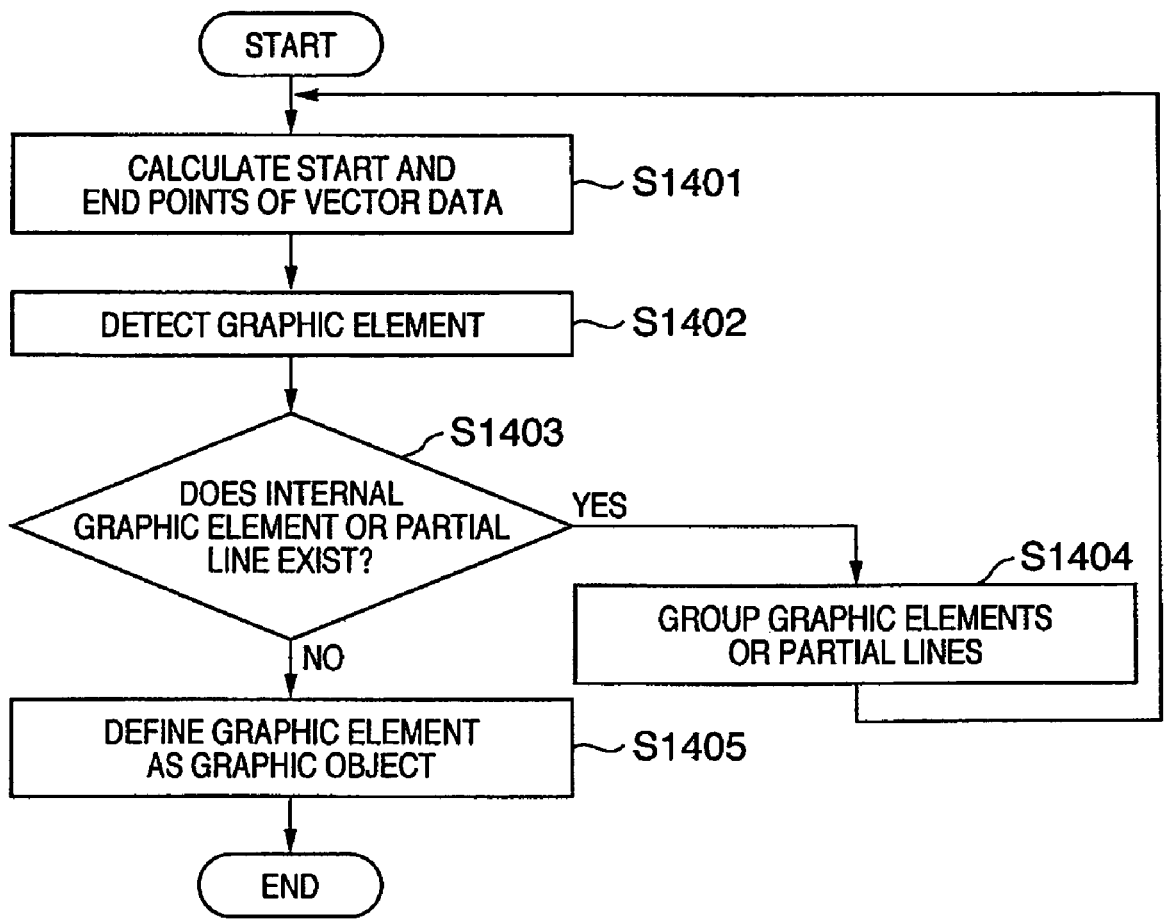

IMAGE PROCESSING APPARATUS AND METHOD THEREFOR

FIELD OF THE INVENTION

The present invention relates to an image processing apparatus and method therefor and, more particularly, to an image process which selectively uses input image data and its original data.

BACKGROUND OF THE INVENTION

In recent years, amid calls for environmental issues, there has been a rapid progression toward paperless offices.

As the first paperless method, documents stored in binders and the like are read by a scanner or the like. Raster data or encoded data (to be generally referred to as "image data" hereinafter) of the document image is converted into a compact file of a portable document format (PDF) or the like. The PDF file is then stored in a storage device (see, e.g., Japanese Patent Laid-Open No. 2001-358863).

As the second method, the original data files of documents and images are stored in a storage device by using a function-expanded printing apparatus or multi-functional peripheral equipment (MFP). In printing an original data file, pointer information on a storage area in the storage device where the original data file exists is printed as additional information on the cover of a printed document or in print information (see, e.g., Japanese Patent Laid-Open No. 10-285378). The original data file can be accessed from the pointer information of the printed document, and used for printing. No printed document need be read, and an unwanted increase in image data can be prevented.

According to the first method, a document image read by the scanner can be saved as a compact PDF file. However, no saved PDF file can be searched for from a printed document obtained by printing out the PDF file, and it is difficult to reuse the saved PDF file.

According to the second method, an original data file can be searched for from pointer information, and can be printed. However, the second method does not cope with editing and reprocessing of the original data file information.

In order to easily reuse a printed document and information which is saved as image data, input image data is converted into vector-format data (to be referred to as "vector data" hereinafter) (which will be referred to as "vector conversion" hereinafter), enhancing reusability. In vector conversion, image segmentation is executed for the image of each page in image data of a document image or electronic data which is saved as image data. The image is segmented into blocks such as a text, table, photo, and line image.

When the block is, e.g., a text block, character recognition is performed. Vector conversion is done by extracting pixels which express a text from the entire image and converting them into an outline vector. Outline vector conversion can provide resolution-independent data whose image quality does not change even if a text is enlarged/reduced. As for a table, pixels which express a ruled line are extracted from the entire image, converted into outline vectors, and thereby converted into resolution-independent data. The data further undergoes pattern recognition to recognize a table structure. Similarly, a photo, line image, and the like are extracted from the entire image and individually converted.

Data which is extracted from an entire image and individually undergoes an optimal process can be edited such that the layout is changed, and the edited data can be printed. Extracted data can also be arbitrarily selected, and saved or transmitted as another data.

In addition to vector conversion of image data, image data can be generated by adding metadata containing pointer information on an original data file. Such image data allows the user to access, and print or transfer the original data file. When original data is vector data, the received original data can be directly edited and processed. For image data whose original data has not undergone vector conversion, the received original data is converted into vectors, and then edited and processed.

If processing and editing of image data by vector conversion are implemented, the character size in original data can be increased to an arbitrary one and then the data can be printed in distributing a material to a person who has poor eyesight. Printing which considers the distribution destination of a material can be achieved such that a printed document which is easily read by even a person who has poor eyesight is distributed.

As an example of processing and editing, a document image is scanned by an MFP, a preview is displayed, a touch panel is operated, and each object obtained by image segmentation can be arbitrarily enlarged and printed. Considering a case wherein these operations are performed by a person who has poor eyesight, a text is automatically enlarged to an arbitrary size, a series of layout operations are also automated, and a function more friendly to a person who has poor eyesight can be provided. A method of providing a print result desired by the user by simple operation on the MFP without the mediacy of any computer or the like is very friendly to a user who is unaccustomed to computer operation.

It is assumed that a document image printed by freely editing and processing image data as described above or a document image newly stored as image data is input to the MFP again, printed, and used, i.e., is reused. In this case, the user may want to use original data before editing and processing, or use edited/processed image data. For example, when a document printed upon changing its layout for a person who has poor eyesight is to be redistributed, he desirably receives a document which is printed upon changing its layout. When the redistribution destination is a person who has normal eyesight, he desirably receives a document having the layout of original data. Considering these cases, the MFP must cope with an output of original data and an output of edited/processed image data.

SUMMARY OF THE INVENTION

The first aspect of the present invention discloses an image processing apparatus which comprises a first input section, arranged to input image data; an extractor, arranged to extract, from the image data, pointer information for specifying a storage location of original data of the image data and image process information representing whether the image data is attained as a result of an image process on the original data; an obtainer, arranged to obtain selection information representing which of the image data and the original data is used; a converter, arranged to convert the image data into vector data when no pointer information is extracted, when the image process information represents that no process has been done, or when the selection information represents use of the image data; a second input section, arranged to input the original data on the basis of the pointer information when the pointer information is extracted, the image process information represents that the process has been done, and the selection information represents use of the original data; and an image processor, arranged to form an image on the basis of the vector data or the original data.

The second aspect of the present invention discloses an image processing method which comprises the steps of: extracting, from input image data, pointer information for specifying a storage location of original data of the image data; obtaining image process information representing whether the image data is attained as a result of an image process on the original data; and prompting a user to select which of the image data and the original data is used when the pointer information is extracted and the image process information represents that the image process has been done.

According to the present invention, an image can be formed by selectively using input image data and its original data. For example, when an image printed by freely editing and processing an input image by vector conversion and meta information is to be input and reused, a desired one of original data before processing and processed image data can be freely selected.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4A is a view for explaining an example of original data;

FIG. 5 is a view for explaining block selection;

FIGS. 6A and 6B are tables showing an example of the result of block selection;

FIG. 9 is a view for explaining a corner extraction process in vector conversion;

FIG. 11 is a flowchart showing a process of grouping vector data generated by vector conversion;

DETAILED DESCRIPTION OF THE PREFERRED EMBODIMENTS

An image process according to embodiments of the present invention will be described in detail below with reference to the accompanying drawings.

First Embodiment

[Image Processing System]

Figure 1:
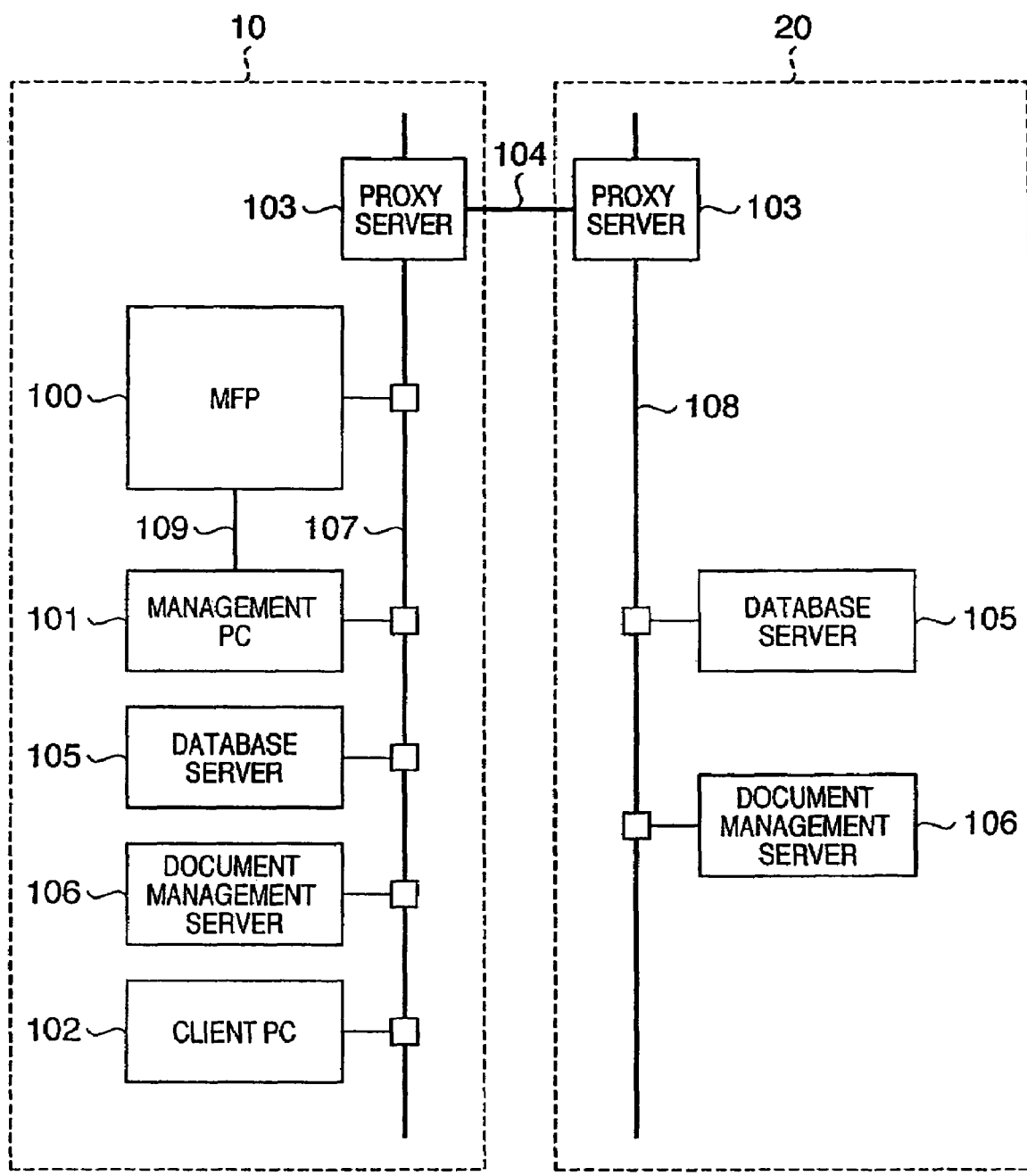
FIG. 1 is a block diagram showing the configuration of an image processing system according to the first embodiment.

FIG. 1 is a block diagram showing the configuration of an image processing system according to the first embodiment.

The image processing system is implemented in an environment where a plurality of sections, e.g., offices 10 and 20 are connected by a wide area network (WAN) 104 such as the Internet.

A local area network (LAN) 107 constructed in the office 10 is connected to, e.g., a multi-functional peripheral equipment 100, a management PC 101 which controls the MFP 100, a client PC 102, a document management server 106, and a database server 105 which is managed by the document management server 106. The office 20 has almost the same arrangement as that of the office 10. A LAN 108 constructed in the office 20 is connected to at least another document management server 106, and another database server 105 which is managed by the document management server 106. The LAN 107 in the office 10 and the LAN 108 in the office 20 are connected to each other via a proxy server 103 connected to the LAN 107, the WAN 104, and another proxy server 103 connected to the LAN 108.

The MFP 100 executes some of image processes of reading a document image and processing the read image. An image signal output from the MFP 100 is input to the management PC 101 via a communication line 109. The management PC 101 is a general personal computer (PC), and comprises a memory (e.g., hard disk) which stores images, an image processing unit which is formed from hardware or software, a monitor (e.g., CRT or LCD), and an input unit (e.g., mouse or keyboard). Some of these units are integrated into the MFP 100. In the following description, the management PC 101 executes a search process and the like. However, processes by the management PC 101 may be executed by the MFP 100.

[MFP]

Figure 2:
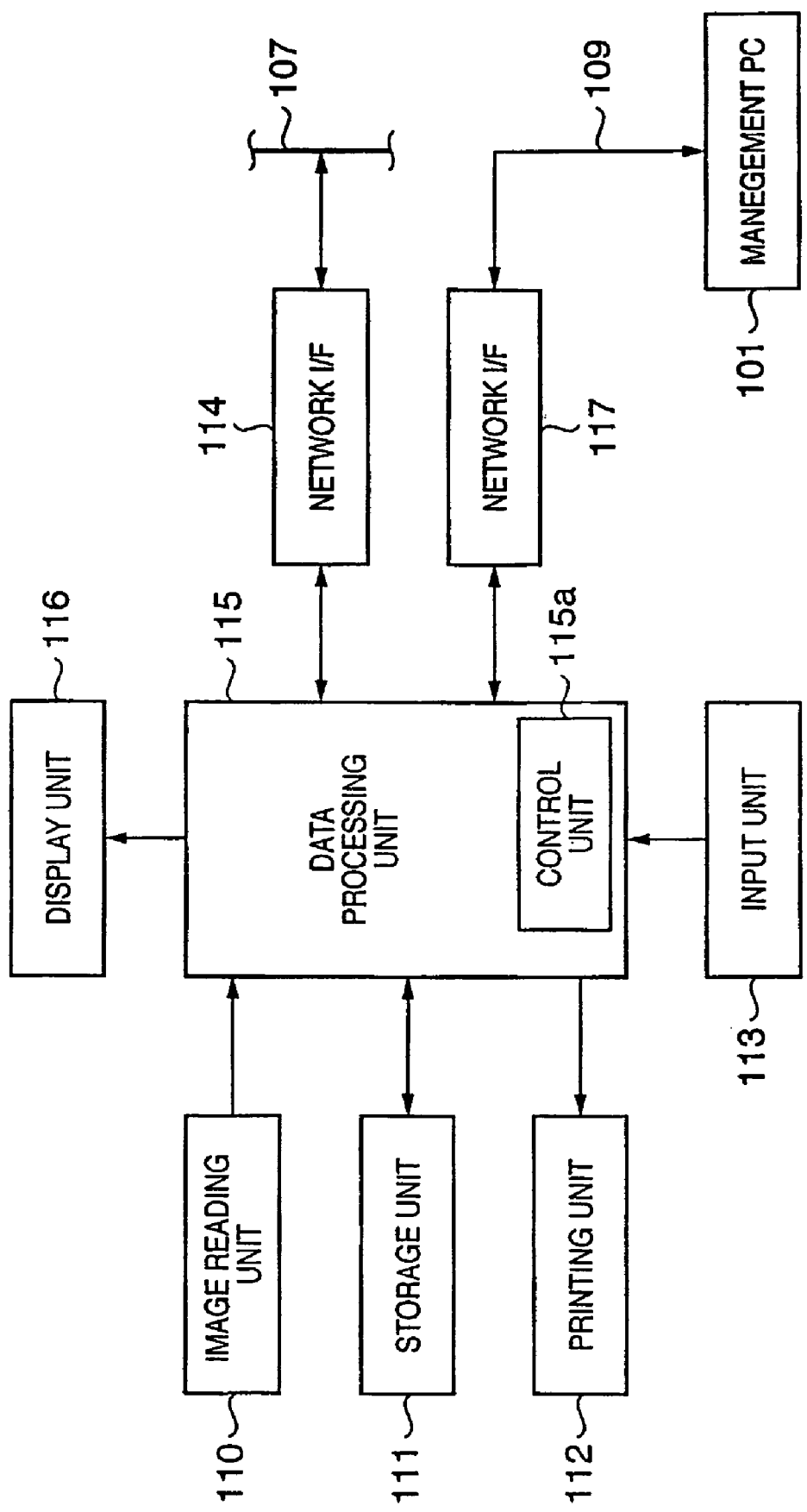
FIG. 2 is a block diagram showing the configuration of an MFP.

FIG. 2 is a block diagram showing the configuration of the MFP 100.

An image reading unit 110 including an auto document feeder (ADF) irradiates the images of one or a plurality of stacked document sheets with a light source, and forms a reflected image of the document on a solid-state image sensing element via a lens. The image reading unit 110 obtains image reading signals (e.g., 8 bits for 600 dpi) in the rater order from the solid-state image sensing element. To copy a document, the image reading signal is converted into a printing signal by a data processing unit 115. To copy on a plurality of printing sheets, printing signals of one page are temporarily stored in a storage unit 111, and repetitively output to a printing unit 112 to form an image on a plurality of printing sheets.

Print data output from the client PC 102 is input to a network interface (I/F) 114 via the LAN 107. The print data is converted into printable raster data by the data processing unit 115, and formed as an image on a printing sheet by the printing unit 112.

An input unit 113 including the key operation unit of the MFP 100 and the keyboard and mouse of the management PC 101 receives an instruction from the operator to the MFP 100. A display unit 116 displays an operation input and the state of an image process.

Operation of the MFP 100 is controlled by a control unit 115a which is formed from, e.g., a one-chip microcontroller in the data processing unit 115.

The storage unit 111 can also be controlled by the management PC 101. Data transmission/reception and control between the MFP 100 and the management PC 101 are executed via a network I/F 117 and the communication line 109 which directly connects the MFP 100 and management PC 101.

Note that the MFP 100 may comprise, as part of the input unit 113, an image sensing apparatus (e.g., a digital camera or digital video camera), a portable terminal apparatus (e.g., a portable digital assistant: PDA), and an interface for acquiring image data from a facsimile apparatus or the like.

[Outline of Process]

Figure 3:
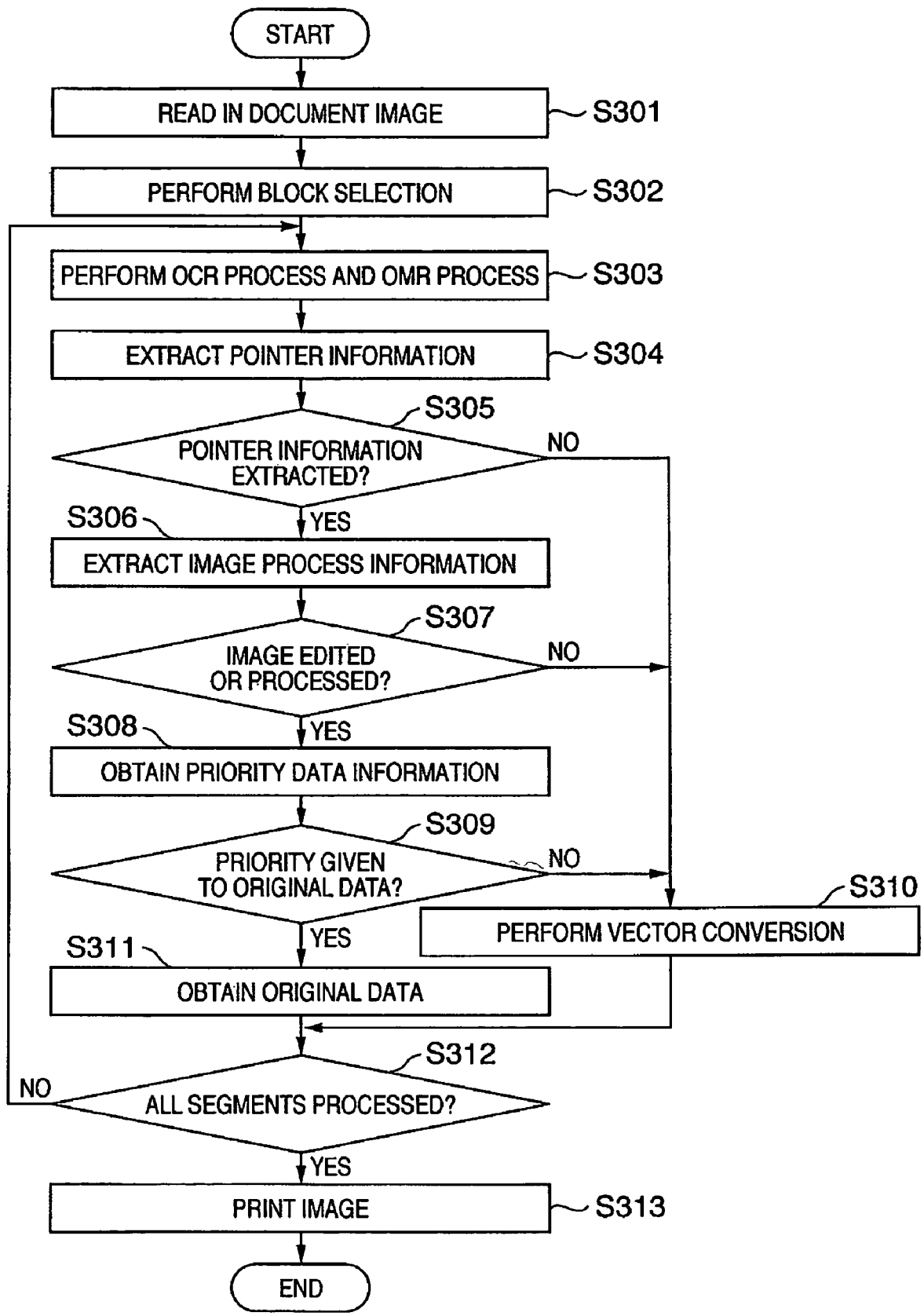
FIG. 3 is a flowchart for explaining the outline of a process by the image processing system.

FIG. 3 is a flowchart for explaining the outline of a process by the image processing system.

The MFP 100 operates the image reading unit 110 to raster-scan the image of one document and obtain an image reading signal. The image reading signal is pre-processed by the data processing unit 115, and saved as 1-page image data of the input image in the storage unit 111 (S301).

The management PC 101 performs a block selection (BS) process, and segments the image data stored in the storage unit 111 into a text-and-line block containing a text or line image, a halftone photo block, an indefinite image block, and another block. The text-and-line block is segmented into a text block mainly containing a text, and a line block mainly containing a table, figure, and the like. The line block is segmented into a table block and picture block (S302). In the first embodiment, connected pixels are detected, and image data is segmented into blocks of respective attributes on the basis of, e.g., the shape, size, and pixel density of the circumscribed rectangle block of connected pixels. However, another block segmentation method can also be adopted.

The text block is segmented into rectangular blocks (rectangular blocks of the text block) each formed from a cluster of a text such as a paragraph. The line block is segmented into rectangular blocks (rectangular blocks of the table block and those of the line block) each formed from an object such as a table or figure. The photo block expressed by halftone is segmented into rectangular blocks such as rectangular blocks of the image block and those of the background block. Information of these rectangular blocks Is called "block segmentation information".

In order to extract original data file pointer information embedded in each segment, optical character recognition (OCR) and optical mark recognition (OMR) are executed (S303). More specifically, a two-dimensional code printed as additional information on an input image or an object corresponding to a uniform resource locator (URL) is detected. The URL is recognized by OCR, the two-dimensional symbology is analyzed by OMR, and original data file pointer information of each segment is detected. The means for adding pointer information is not limited to the two-dimensional symbology. Instead, the present invention can employ a method using a so-called digital watermark which is not directly visually recognized, for example, a method of embedding information as a change in the spacings between neighboring character strings, or a method of embedding a halftone image.

Pointer information is extracted from the result of the OCR and OMR processes or digital watermark information (S304). If it is determined in step S305 that pointer information has been extracted, the process advances to step S306; if no pointer information is extracted, to step S310.

If pointer information has been extracted, image process information contained in the result of the OCR and OMR processes or the digital watermark information is extracted (S306). It is determined whether the image of the current segment has been edited and processed from original data (S307).

Figure 4B:
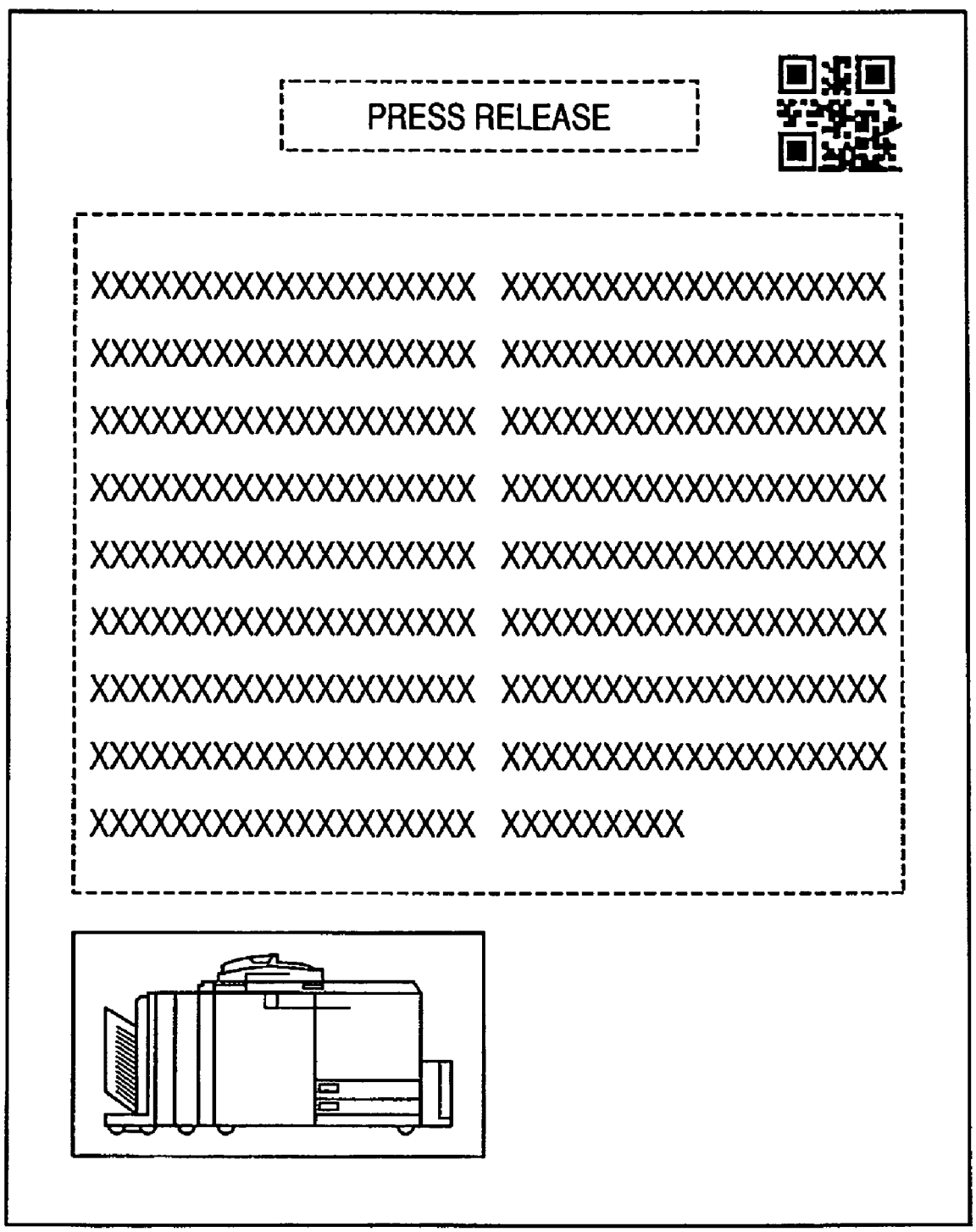
FIG. 4B is a view for explaining an example of edited/processed image data.

Editing and processing of original data correspond to a change of the layout, correction of the color, a change of the font type, and the like. For example, original data shown in FIG. 4A is changed into image data shown in FIG. 4B. The image data shown in FIG. 4B is obtained by using vector data or the like, enlarging the text block, and changing the layout in printing by the MFP 100 so that the user can easily read the text.

The image shown in FIG. 4B is attained by changing the layout of original data in printing by the MFP 100 so that the user can easily read the text. More specifically, the text block of original data obtained as vector data is enlarged to increase the font size. To the contrary, the photo block is reduced by converting the resolution of image data. Note that the changed font size information, reduction ratio information, and the like are also recorded as part of image process information.

In addition to the example shown in FIGS. 4A and 4B, the font may be converted in printing by the MFP 100, or color original data may be printed by a monochrome MFP 100. Also in this case, the resultant data can be regarded as edited/processed image data of original data.

If it is determined on the basis of the image process information that the segment is obtained by editing and processing the original data, priority data information representing whether to use original data or input image data for the segment is obtained from the control unit 115a of the MFP 100 (S308).

If the image data and original data of the segment are identical, i.e., the original data has not been edited or processed, or if the priority data information represents priority to the original data, the storage unit 111 is searched in accordance with the pointer information to obtain the original data (S311). Note that the original data file may be stored not only in the storage unit 111 but also in the hard disk of the client PC 102, the database server 105 of the office 10 or 20, or the like. Even in this case, an original data file can be searched for on the basis of pointer information.

If no pointer information is extracted or the priority data information represents priority to input image data, vector conversion of the segment is executed to convert image data of the segment into vector data (S310).

It is determined whether all segments have been processed (S312). If an unprocessed segment remains, the process returns to step S303. If all segments have been processed, the MFP 100 prints the document on the basis of the vector data and/or the obtained original data (S313). In addition to printing a document, the document can be transmitted to the client PC 102, or transmitted to the document management server 106 of the office 10 or 20 and stored in the database server 105.

The processes of main steps shown in FIG. 3 will be explained in detail below.

[Block Selection (S302)]

In block selection, a 1-page image shown in FIG. 5 is recognized as a set of objects. The attribute of each object is determined as TEXT, PICTURE, PHOTO, LINE, or TABLE, and the image is segmented into segments (blocks) having different attributes. An example of block selection will be described below.

A target image is binarized into a monochrome image, and a cluster of pixels surrounded by black pixels is extracted by outline tracing. In a cluster of black pixels with a predetermined area or more, outline tracing is performed for internal white pixels to extract a cluster of white pixels. Further, a cluster of black pixels is extracted from a cluster of white pixels with a predetermined area or more. In this manner, clusters of black pixels and those of white pixels are recursively extracted.

A rectangular block which circumscribes an obtained pixel cluster is generated, and the attribute is determined on the basis of the size and shape of the rectangular block. For example, a pixel cluster having an aspect ratio of almost 1 and a size of a predetermined range is defined as a pixel cluster of the text attribute. When neighboring pixel clusters of the text attribute are neatly arranged and can be grouped, they are defined as a text block. A plane pixel cluster having a low aspect ratio is defined as a line block. The range of a black pixel cluster which has a predetermined size or more and an almost rectangular shape, and contains neatly arranged white pixel clusters is defined as a table block. A block in which indefinite pixel clusters scatter is defined as a photo block. A pixel cluster with another arbitrary shape is defined as a picture block.

FIGS. 6A and 6B are tables showing an example of the results of block selection. FIG. 6A shows block information of each extracted rectangular block. Block information contains the attribute of each block, position coordinates X and Y, width W, height H, OCR information, and the like. The attribute is given by numerical values 1 to 5. "1" represents the text attribute; "2", the picture attribute; "3", the table attribute; "4", the line attribute; and "5", the photo attribute. The coordinates X and Y indicate the X and Y coordinates (coordinates of the upper left corner) of the start point of each rectangular block in an input image. The width W and height H represent the width of the rectangular block in the X direction and the height in the Y direction, respectively. OCR information represents the presence/absence of pointer information.

FIG. 6B shows input file information, and represents the total number of rectangular blocks extracted by block selection.

Block information of each rectangular block is used for vector conversion of a segment. The block information can specify the positional relationship between a vector-converted segment and raster data. A vector-converted block and raster data block can be composited without changing the layout of an input image.

[Extraction of Pointer Information and Image Process Information (S304 and S306)]

Figure 7:
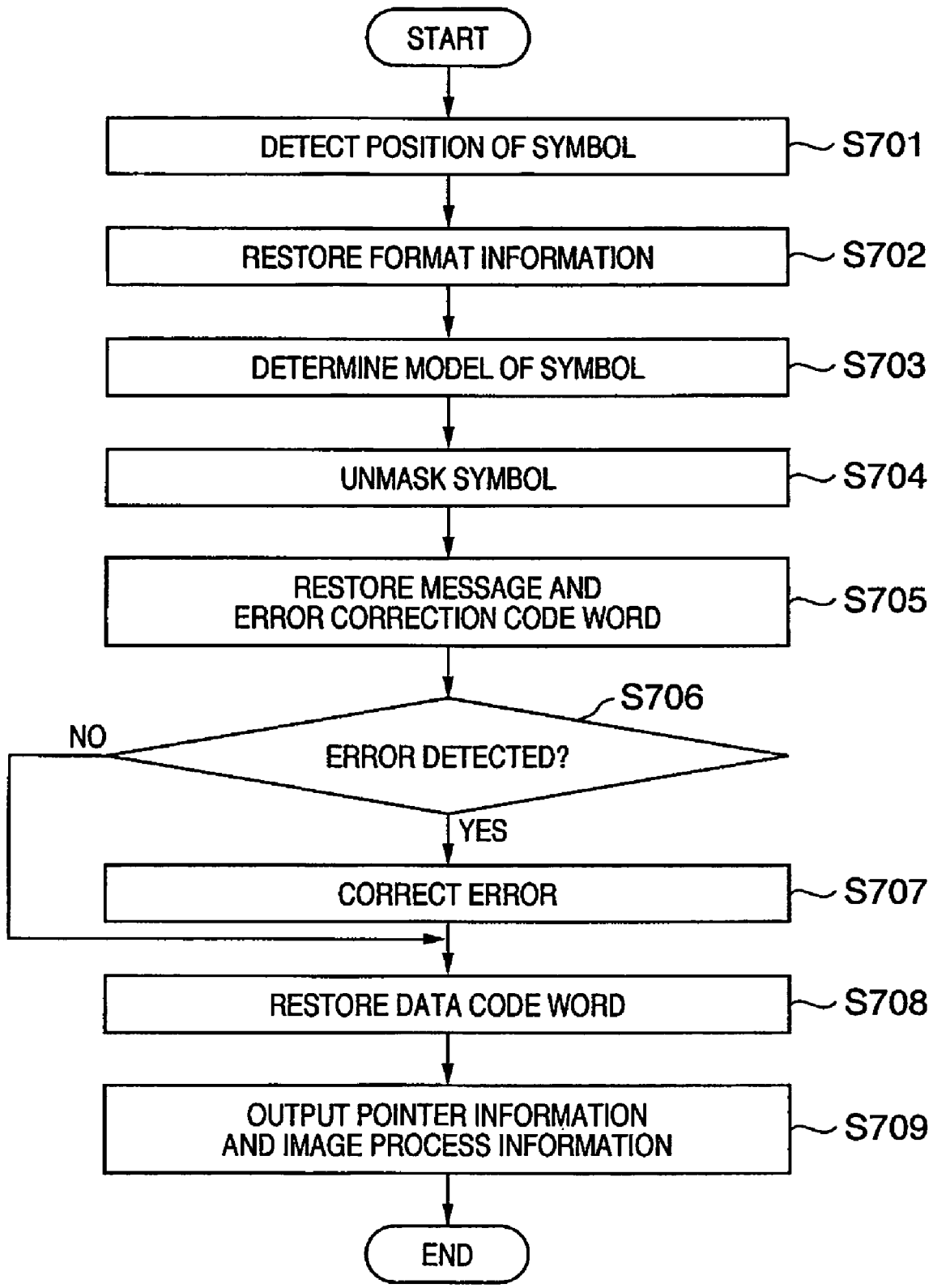
FIG. 7 is a flowchart showing a process of extracting pointer information and image process information from image data of a segment.

FIG. 7 is a flowchart showing a process of extracting pointer information and image process information from image data of a segment. This process is executed by the data processing unit 115 (or management PC 101) after image data to be extracted is stored in the page memory (not shown) of the data processing unit 115. Assume that an image to be extracted contains a text block, picture block, and symbol of two-dimensional symbology, as shown in FIG. 4B. A QR code® as a typical two-dimensional symbology will be exemplified.

The position of a QR code® symbol is detected from block information serving as a process result of block selection (S701). Specific position detection element patterns are located at three out of four corners of the QR code® symbol. The QR code® symbol can be detected by detecting the position detection element patterns.

Format information that neighbors the position detection patterns is restored to obtain an error correction level and mask pattern applied to the symbol (S702), and the model of the symbol is determined (S703). The obtained mask pattern and the encoded region bit pattern of the QR code® symbol are XORed to unmask the QR code® symbol (S704).

A layout rule is obtained on the basis of the determined model, a symbol character is read on the basis of the layout rule, and a message and error correction code word are restored (S705). An error is detected from the restored message on the basis of the error correction code word (S706). If an error is detected, the restored message is corrected (S707).

The data code word is divided into segments on the basis of a mode indicator and character count indicator from the restored message, and the data code word is restored (S708). Data code characters are decoded on the basis of the detected specification mode, and output as pointer information and image process information (S709).

Data embedded in a two-dimensional symbology represents pointer information and image process information of an original data file. The pointer information is formed from, e.g., a path name including a file server name and file name, or a URL indicating a corresponding file. The image process information takes "1" when an image process is done, and non when no image process is done.

The first embodiment has exemplified image data to which pointer information and image process information are added as a two-dimensional symbology. However, various methods can be adopted as the recording form of pointer information and image process information. For example, pointer information and image process information may be directly recorded as a character string in accordance with a predetermined rule (e.g., encryption), and the rectangular block of the character string may be detected by block selection. By recognizing (e.g., decryption) the detected character string, the pointer information and image process information can be extracted. Alternatively, imperceptible modulation can be applied to the spacings between neighboring character strings in a text block, and pointer information and image process information can be expressed by the modulation information of the spacings between the character strings. When a character recognition process (to be described later) is performed, the digital watermark can be detected by detecting the spacings between characters, and pointer information and image process information can be extracted. Needless to say, pointer information and image process information can be added as a digital watermark to a photo block and picture block.

[Obtainment of Electronic File (S311)]

The management PC 101 specifies a file server on the basis of a path name or URL contained in pointer information. The management PC 101 accesses the file server (corresponding to the data processing unit 115 of the MFP 100, the client PC 102, or document management server 106), and requests the file server to transfer an original data file. Upon reception of the request, the file server searches for the original data file on the basis of the path name or URL attached to the request.

If the file server detects the original data file, it transfers the original data file to the data processing unit 115 of the MFP 100. If the file server cannot detect any original data file, it notifies the management PC 101 (or data processing unit 115) of a message to this effect.

[Vector Conversion (S310)]

Vector conversion is achieved by the following method.

(a) For a segment of the text attribute, a text pattern is converted into a character code by the OCR process. Alternatively, the character size, style, and font are recognized, and a text pattern is converted into visually faithful font data.

(b) When character recognition by the OCR process is impossible for a segment of the line or text attribute, the outline of a line image or character is traced and converted into a form which expresses outline information as a link of line segments.

(c) For a segment of the picture attribute, the outline of a picture object is traced and converted into a form which expresses outline information as a link of line segments.

(d) Outline information in the form of line segments that is obtained by method (b) or (c) is fit by the Bezier function or the like, and is converted into function information.

(e) The shape of a figure is recognized from outline information of the picture object that is obtained by method (c), and converted into figure definition information such as a circle, rectangle, or polygon.

(f) For a segment of the table attribute, a ruled line and frame are recognized and converted into form information of a predetermined format.

In addition to the above method, there are various vector conversion methods of replacing image data with command definition information such as code information, figure information, or function information.

[Vector Conversion of Text Block]

Figure 8:
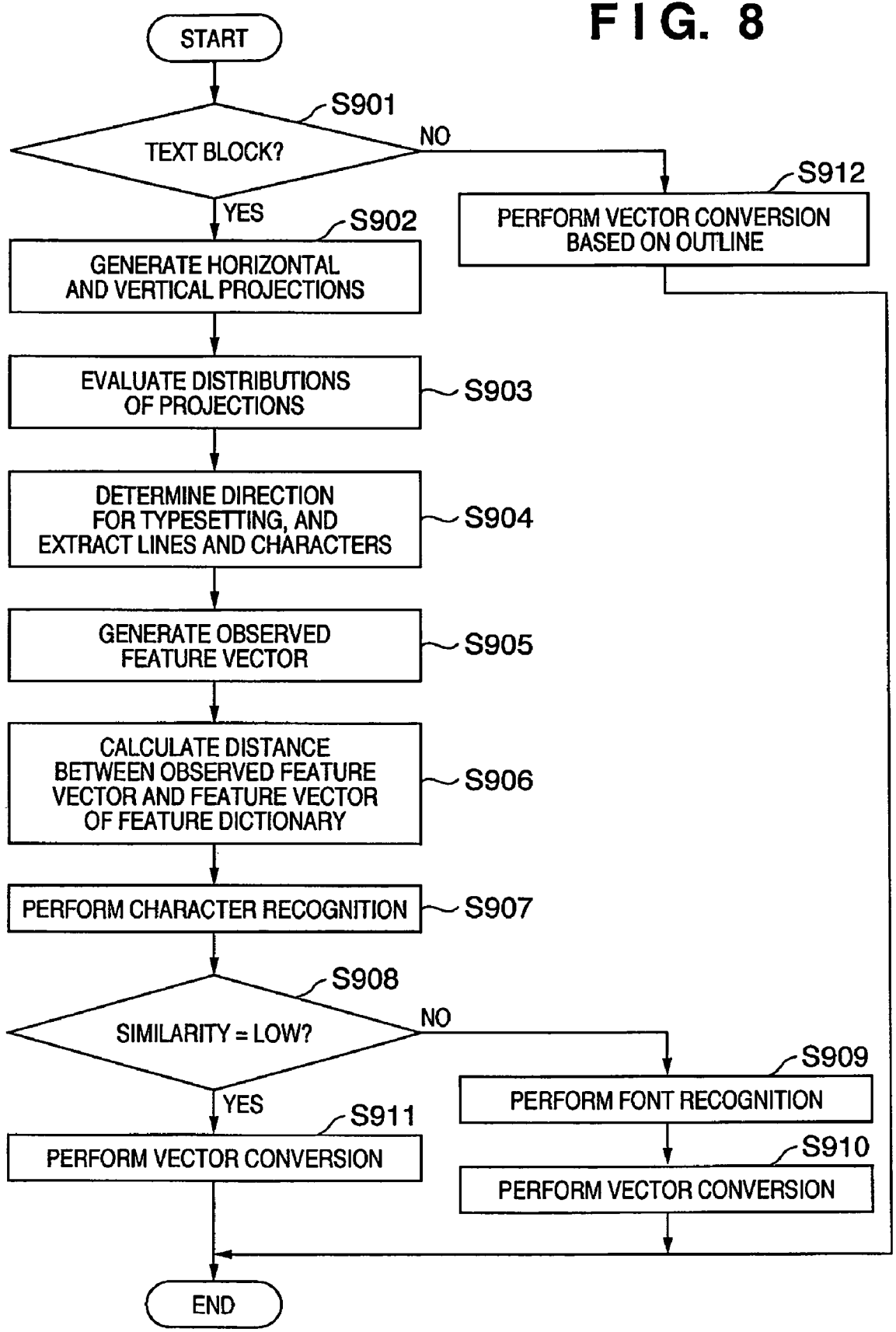
FIG. 8 is a flowchart showing details of vector conversion.

FIG. 8 is a flowchart showing details of vector conversion (S310), and this process is executed by the data processing unit 115 (or management PC 101).

It is determined by referring to block information whether a segment has the text attribute (S901). If the segment has the text attribute, the process advances to step S902 to perform character recognition using a given pattern matching method and obtain a corresponding character code.

If the segment has an attribute other than the text attribute, vector conversion based on the outline of an image is executed (S912), which will be described in detail later.

If the segment has the text attribute, horizontal and vertical projections of pixel values are calculated (S902), and the distributions of the projections are evaluated (S903) in order to determine whether the direction for typesetting is the horizontal or vertical writing. If the distribution of the horizontal projection is larger, it is determined that the direction for typesetting is the horizontal writing; if the distribution of the vertical projection is larger, it is determined that the direction for typesetting is the vertical writing. Lines are extracted on the basis of the determination result, and then characters are extracted to obtain a character image (S904).

In decomposition into character strings and characters, lines are extracted using the horizontal projection in the horizontal writing, and characters are extracted from the vertical projection of the extracted lines. A text block in the vertical writing undergoes a process which is reversed in the horizontal and vertical writing. In extracting lines and characters, the character size can also be detected.

The observed feature vector of each extracted character is generated by converting a feature obtained from a character image into a several-ten-dimensional numerical value string (S905). Various known methods are available for feature vector extraction. For example, a character is segmented into a mesh pattern, and character lines in respective meshes are counted as line elements depending on their directions to obtain a (mesh count)-dimensional vector as a feature.

The observed feature vector is compared with a feature vector which is obtained in advance for each character type and stored in a feature dictionary, and the distance between the feature vectors is calculated (S906). The calculated distance is evaluated, and a character with the shortest distance is output as a recognition result (S907). The shortest distance as the result of distance evaluation is compared with a threshold. If the shortest distance is smaller than the threshold, it is determined that the similarity is high; if the shortest distance is equal to or larger than the threshold, it is determined that the similarity is low (S908). If the shortest distance is equal to or larger than the threshold (similarity is low), the character is highly likely to be erroneously recognized as another character having a similar shape. For this reason, the recognition result in step S907 is not employed, the character image is processed like a line image, and the outline of the character image is converted into vectors (S911). In other words, for a character image which is highly likely to be erroneously recognized, vector data of a visually faithful outline is generated.

If the similarity is high, the recognition result in step S907 is employed, font information is output together with the character code, and the character font is recognized (S909). Font recognition is executed by preparing a plurality of feature dictionaries for respective character types used in character recognition in correspondence with character shape types, i.e., font types. Each character is converted into vector data by referring to the character code and font information which are obtained by character recognition and font recognition, and using outline data which are prepared in advance in correspondence with the character code and font information (S910). For color image data, the character color is extracted and recorded together with vector data.

By the above process, a character image contained in a segment of the text attribute can be converted into vector data with a nearly faithful shape, size, and color.

[Vector Conversion of Blocks Except Text Block (S912)]

As for segments which are determined to have the picture attribute, line attribute, and table attribute other than the text attribute, a cluster of black pixels is extracted, and its outline is converted into vector data. Note that a segment of the photo attribute is not converted into vectors and is kept unchanged from image data.

In vector conversion of a block other than a text block, "corners" which divide a curve into a plurality of sections (pixel strings) are detected, in order to express a line image or the like as a combination of lines and/or curves. FIG. 9 is a view for explaining a corner extraction process in vector conversion. The corner means a point corresponding to a maximal curvature, and whether a pixel Pi on the curve in FIG. 9 is a corner is determined as follows.

The pixel Pi is defined as a starting point, and pixels Pi−k and Pi+k separated from the pixel Pi by a predetermined number k of pixels in opposite directions along the curve of the line image are connected by a line segment L. Let d1 be the distance between the pixels Pi−k and Pi+k, and d2 be the length (distance between the pixel Pi and the line segment L) of a line segment which is drawn from the pixel Pi so as to cross the line segment L at a right angle. Then, when d2 maximizes or when a ratio d1/A of an arc length A between the pixels Pi−k and Pi+k and the distance d1 is equal to or lower than a predetermined threshold, the pixel Pi is determined as a corner.

After corners are detected, the pixel strings of the line image curve divided at the corners are approximated by lines or curves. Approximation into a line is executed by the least-squares method or the like, whereas approximation into a curve is executed using a ternary spline function or the like. A pixel at a corner which divides a pixel string serves as the start or end of an approximate line or approximate curve.

It is determined whether an inside outline of a white pixel cluster exists in a vector-converted outline. If an inside outline exists, the outline is converted into vectors and defined as an inside outline within the inside outline. In this manner, inside outlines of black and white pixel clusters are recursively converted into vectors.

By using the method of approximating an outline into a line or curve, the outline of a figure of an arbitrary shape can be converted into vectors. When an input image is color, the color of the figure is extracted from the color image and recorded together with vector data.

Figure 10:
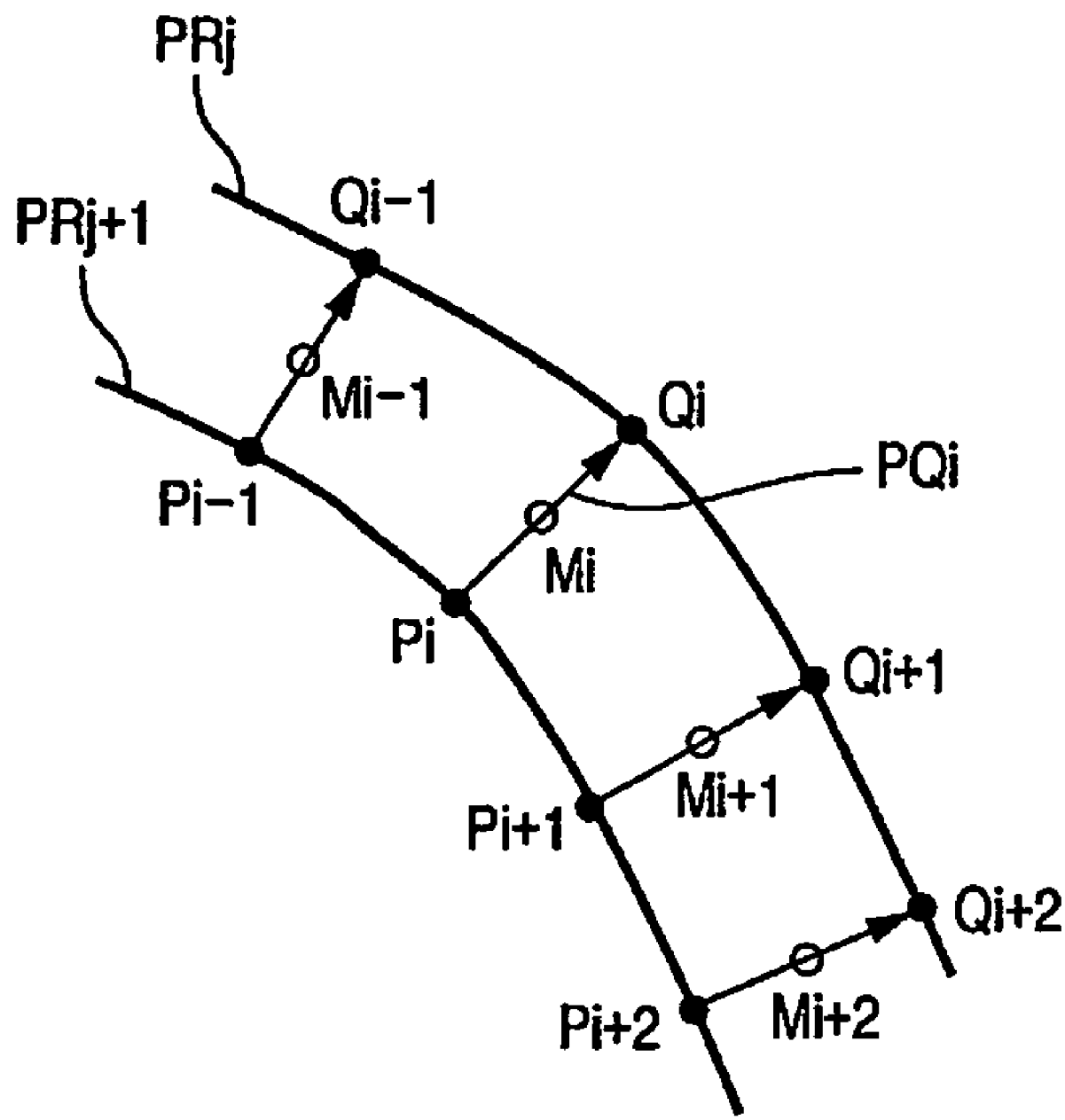
FIG. 10 is a view for explaining a process of combining outlines in vector conversion.

FIG. 10 is a view for explaining a process of combining outlines in vector conversion.

When an outside outline PRJ is close to an inside outline PRj+1 or another outside outline in a section of interest of the outline, two or more outlines can be combined to express a line with a given width. For example, a distance PQ between a pixel Pi on the outline PRj+1 and a pixel Q on the outline PRj having the shortest distance from the pixel Pi is calculated. When the distances PQi between pixels vary slightly, the section of interest between the outlines PRj and PRj+1 is approximated by a line or curve along a point sequence of middle points M on respective line sections PQ. The width of the approximate line or approximate curve along a point sequence of the middle points M is given by, e.g., the average value of the distances PQi.

A ruled line of a table which is a line or a set of lines is expressed as a set of lines having a width, and can be efficiently converted into vectors.

[Recognition of Figure]

After the outline of a line figure or the like is converted into vectors, vector-converted partial lines are grouped for each graphic object.

FIG. 11 is a flowchart showing a process of grouping vector data generated by vector conversion. FIG. 11 shows a process of grouping vector data for each graphic object.

Start and end points of each vector data are calculated (step S1401). By using information on the start and end points, a graphic element is detected (step S1402). The graphic element is a closed figure formed from partial lines. In detection, vectors are connected at a corner pixel serving as start and end points. That is, a principle that vectors which form a closed shape have vectors connected to two ends is applied.

It is determined whether another graphic element or partial line exists in the target graphic element (S1403). If another graphic element or partial line exists, steps S1401 and S1402 are recursively repeated. Detected graphic elements or partial lines are grouped into one graphic object (S1404). If neither graphic element nor partial line exists in the graphic element, the target graphic element is defined as a graphic object (S1405).

FIG. 11 shows only a process for one graphic object. If another graphic object exists, the process in FIG. 11 is repeated.

Detection of Graphic Element (S1402)

Figure 12:
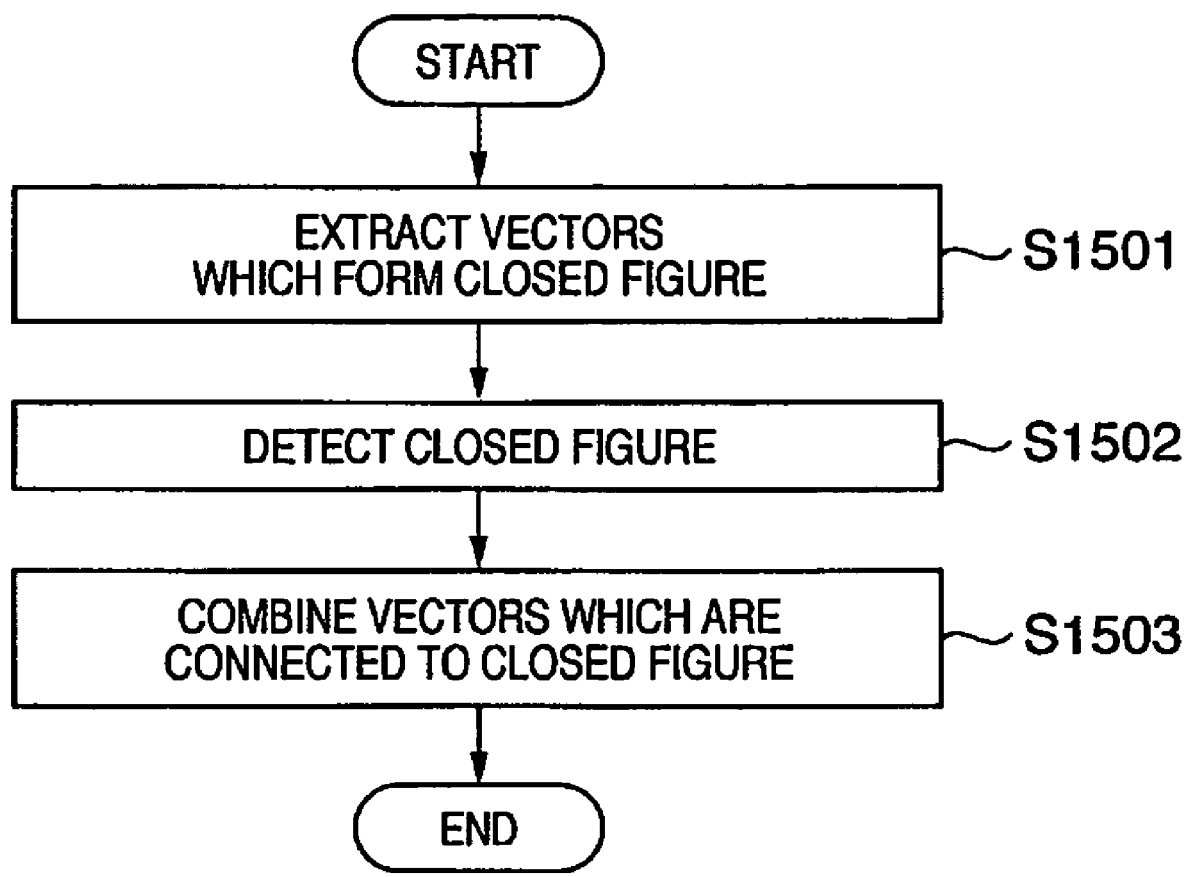
FIG. 12 is a flowchart showing a process of detecting a graphic element.

FIG. 12 is a flowchart showing a process of detecting a graphic element.

Vectors which form a closed figure are extracted from vector data by excluding vectors which are not connected at two ends (step S1501).

Either terminal point (start or end point) of a vector of interest among the vectors which form a closed figure is set as a start point, and vectors are searched for in turn in a predetermined direction (e.g., clockwise). That is, the terminal point of another vector is searched for at the other terminal point of the vector of interest, and the nearest terminal point in a predetermined distance is set as a terminal point of a vector to be connected. After all vectors which form a closed figure are traced to reach the start point, all the passing vectors are grouped as a closed figure which forms one graphic element (S1502). All vectors which form a closed figure inside the closed figure are also recursively grouped. Further, the start point of a vector which has not been grouped yet is set as a start point, and the above process is repeated.

Of the excluded vectors, vectors (vectors to be connected to the closed figure) whose terminal points neighbor the vectors grouped as the closed figure are detected and also grouped together (S1503).

Data Format

Figure 13:
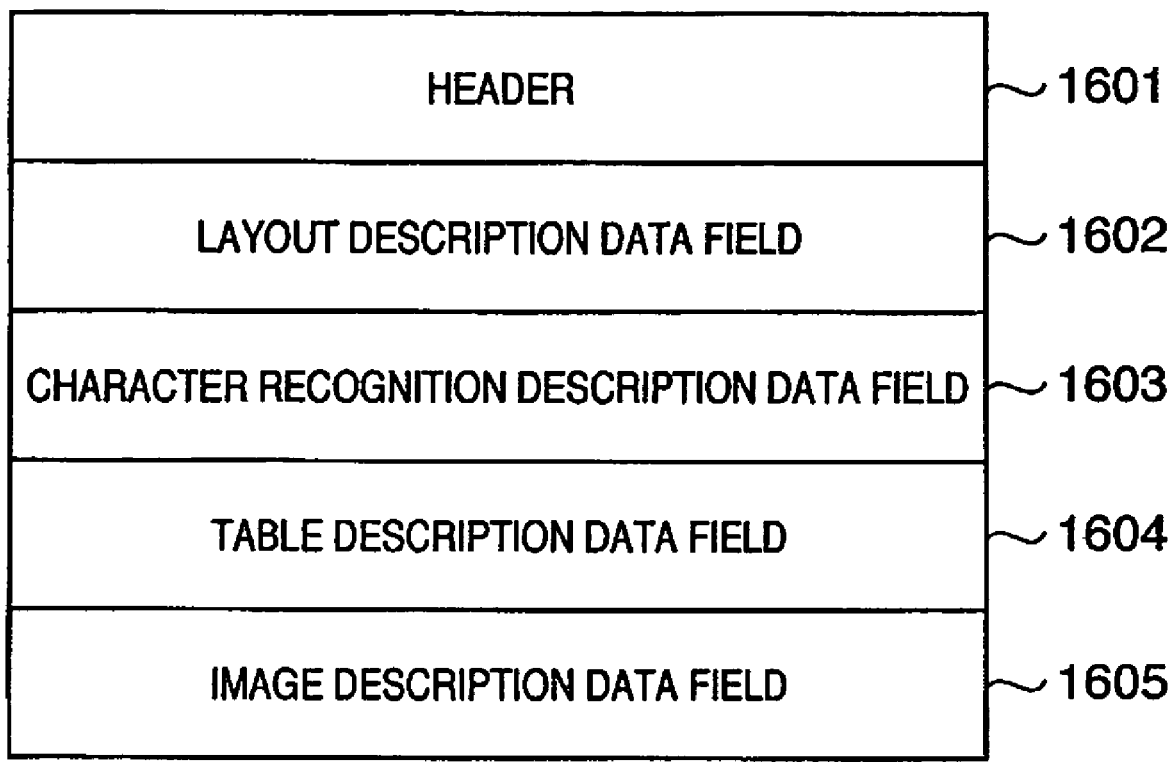
FIG. 13 is a view showing the format of intermediate data representing the result of vector conversion.

A process of conversion into application data in step S313 by using resultant data of vector conversion (S310) after block selection (S302) shown in FIG. 3 is executed. FIG. 13 is a view showing the format of intermediate data representing the result of vector conversion. Intermediate data is saved in a so-called document analysis output format (DAOF).

The DAOF is made up of a header 1601, layout description data field 1602, character recognition description data field 1603, table description data field 1604, and image description data field 1605. The header 1601 holds information on an input image to be processed.

The layout description data field 1602 holds information (e.g., TEXT, TITLE, CAPTION, LINE, PICTURE, FRAME, TABLE, and PHOTO) representing the attributes of rectangular segments in an input image, and position information of the rectangular segments.

The character recognition description data field 1603 holds character recognition results obtained by performing character recognition for a block designated by the user in a rectangular segment of the text attribute such as TEXT, TITLE, or CAPTION.

The table description data field 1604 holds details of the table structure of a rectangular segment of the table attribute. The image description data field 165 holds image data extracted from input image data in a rectangular segment of the picture attribute or line attribute.

For a block subjected to vector conversion, the image description data field 1605 holds the internal structure of a segment obtained by vector conversion and a set of data representing the shape of an image, a character code, or the like. For a rectangular segment in not a designated block but a block not subjected to vector conversion, the image description data field 1605 holds input image data.

By the above process, a graphic block can be treated as an individual graphic object which can be reused.

[Extraction of Priority Data Information (S309)]

In step S309 shown in FIG. 3, priority data information for determining which of input image data and original data is used to process an output image is obtained. The priority data information will be explained.

The user operates the input unit 113 of the MFP 100 to designate which of input image data and original data managed by the document management server 106 or the like is obtained as an output image. The control unit 115*a* of the MFP 100 sets this designation in priority data information. The set priority data information is stored in the control unit 115*a*, and read out from the control unit 115*a* in obtainment of priority data information in step S308.

In order to easily read the text part of original data shown in FIG. 4A, a product (FIG. 4B) printed with a layout in which the text part is enlarged by the MFP 100 is greatly different in appearance from original data managed by the document management server 106 or the like. If the user can easily select which of the layouts is used for printing, he can easily obtain a desirable output result.

In the above description, which of input image data and original data is used is selected when input image data is printed or output via the network I/F 117 (or 114). When the MFP 100 can preview an image on the display unit 116, pointer information exists in step S305, and editing and processing are done in step S307, the MFP 100 previews input image data and original image data so that the user can compare them. In step S308, the user inputs priority data from the input unit 113 of the MFP 100. The user can confirm input image data and original data on the preview and then select either of them, providing a user-friendly configuration.

According to the first embodiment, when a document printed upon changing its layout for a person who has poor eyesight is copied again, a person who also has poor eyesight receives a copy of the document with the changed layout. A person who has normal eyesight can receive a copy in the layout of original data. A convenient system can be implemented.

In addition, the system allows free copying such that even a color document which has been printed once in monochrome is copied as a high-resolution color document or copied in monochrome for mass distribution.

Second Embodiment

An image processing system according to the second embodiment of the present invention will be explained. In the second embodiment, the same reference numerals as in the first embodiment denote the same parts, and a detailed description thereof will be omitted.

In the first embodiment, which of input image data and original data is used is selected on the basis of priority data information. In the second embodiment, even when input image data is to be used, original data is acquired and processed to attain the same output result as that of the input image data, instead of using the input image data itself.

Figure 14:
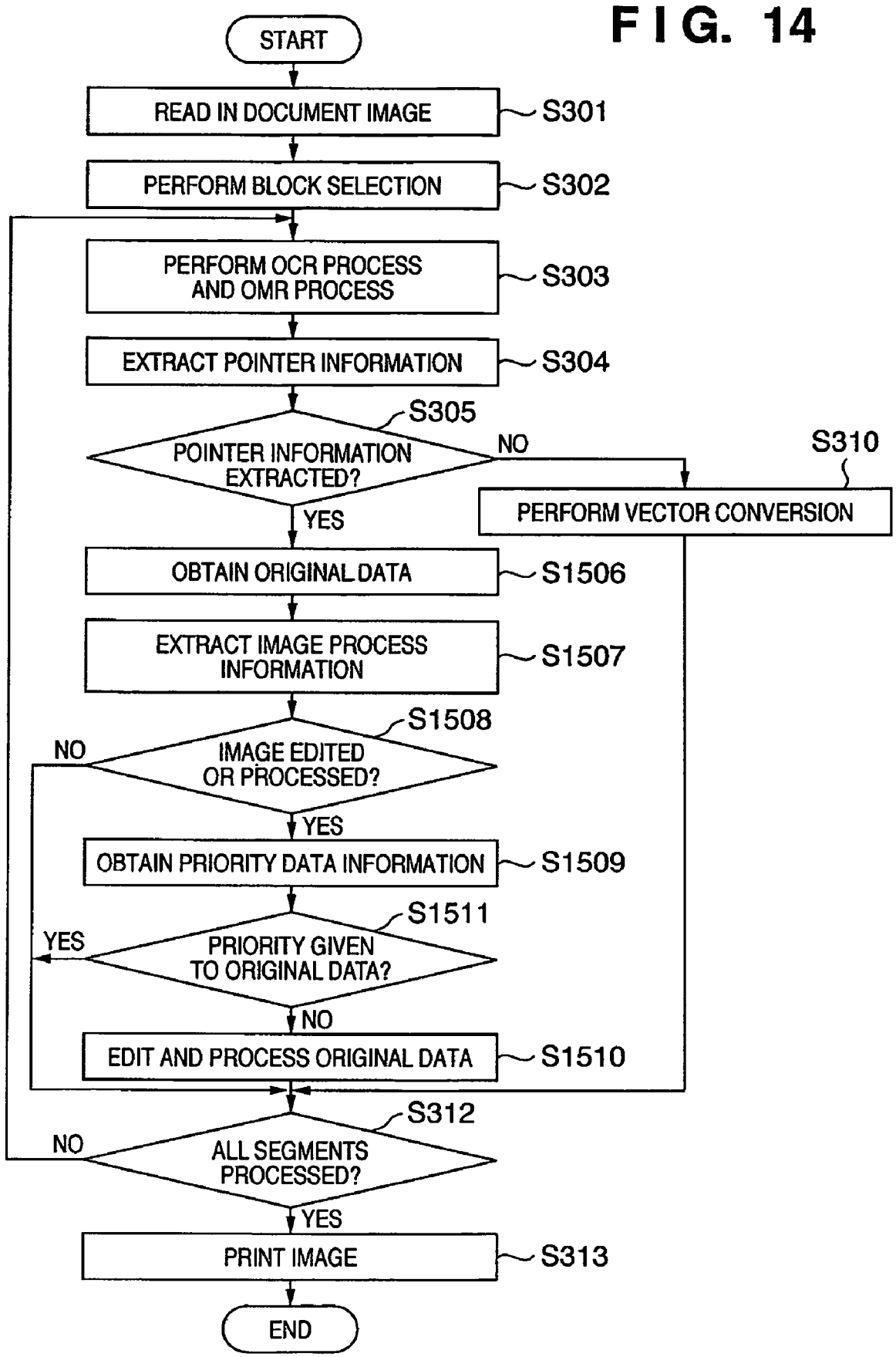
FIG. 14 is a flowchart for explaining the outline of a process by an image processing system according to the second embodiment.

FIG. 14 is a flowchart for explaining the outline of a process by the image processing system according to the second embodiment. The same reference numerals as in the process shown in FIG. 3 denote the same steps, and a detailed description thereof will be omitted.

If it is determined in step S305 that no pointer information is extracted, the process advances to step S310; if pointer information is extracted, a storage unit 111 or the like is searched in accordance with the pointer information to obtain original data (S1506).

Image process information contained in the result of OCR and OMR processes or digital watermark information is extracted (S1507). It is determined whether the image of the current segment has been edited and processed from original data (S1508). If the segment holds the original data (image has not been edited or processed), the process advances to step S312 in order to print the segment with the original data.

If it is determined that the segment has been edited and processed, priority data information representing whether to use the original data or edited/processed data of the original data in the segment is obtained from a control unit 115a of an MFP 100. If the priority data information represents priority to the original data, the process advances to step S312 in order to print the segment with the original data.

If the priority data information represents priority to an input image, the original data undergoes an image process by a data processing unit 115 on the basis of image process contents obtained from the image process information so as to set the same layout as that of the input image (S1510).

Since original data is acquired, edited, and processed even in an output format which gives priority to an input image, an output more faithful to the original image than in the first embodiment can be attained. When the MFP 100 has the preview function, priority to an input image or original image can also be set on the preview.

Modification of Embodiments

The setting timing of priority data information is not limited to a timing before the start of the process shown in FIG. 3 or 14. For example, if it is determined that an input image has been processed after the start of the process shown in FIG. 3 or 14, a message which prompts the user to determine which of the images is given priority may be displayed on the display unit 116 to prompt the user to select either image.

The means for executing an image process is not limited to the configuration of the image processing system shown in FIGS. 1 and 2, and various means such as a dedicated image processing apparatus and general-purpose computer can be employed. When the general-purpose computer is to execute the image process, a program which can be executed by the computer and contains program codes for causing the general-purpose computer to execute steps of the image process is supplied to the general-purpose computer. More specifically, the program is read in from a ROM incorporated in the general-purpose computer, a storage medium readable by the general-purpose computer, or a server or the like via a network.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-347236 filed on Nov. 30, 2004, which is hereby incorporated by reference herein.

What is claimed is:

1. An image processing apparatus, comprising:
a first input section, arranged to input image data;
an extractor, arranged to extract, from the image data, pointer information for specifying a storage location of original data of the image data and image process information representing whether the image data is attained as a result of an image process on the original data;
an obtainer, arranged to obtain selection information representing which of the image data and the original data is used;
a converter, arranged to convert the image data into vector data in a case where no pointer information is extracted, in a case where the image process information represents that no process has been done, or in a case where the selection information represents use of the image data;
a second input section, arranged to input the original data on the basis of the pointer information in a case where the pointer information is extracted, the image process information represents that the process has been done, and the selection information represents use of the original data; and
an image processor, arranged to form an image on the basis of the vector data or the original data.

2. The apparatus according to claim 1, wherein the pointer information and the image process information are added as a two dimensional symbology or a digital watermark to the image data.

3. The apparatus according to claim 1, wherein said first input section includes an image reading device which reads a document image, or an interface which receives image data from the image reading device.

4. The apparatus according to claim 1, further comprising:
a memory, arranged to store image data; and
a network interface,
wherein said second input section receives the original data from said memory or from an external device via said network interface.

5. The apparatus according to claim 1, further comprising a setter, arranged to set the selection information.

6. The apparatus according to claim 1, further comprising a setter, arranged to prompt a user to set the selection information and set the selection information in accordance with an instruction from the user in a case where the pointer information is extracted and the image process information represents that the process has been done.

7. The apparatus according to claim 1, further comprising a segmentation section, arranged to select a block from the image data input from said first input section,
wherein said extractor, said converter, and said second input section execute the process for each block.

8. The apparatus according to claim 7, wherein the image process includes a process of enlarging or reducing each block, and/or moving each block, and changing a layout of the image.

9. The apparatus according to claim 7, wherein the image process includes a process of changing at least one of a character size and a font type of the block having a text attribute.

10. The apparatus according to claim 1, wherein the image process includes a process of converting a color image into a monochrome image.

11. An image processing method, comprising using a computer to perform the steps of:
inputting image data;
extracting, from the image data, pointer information for specifying a storage location of original data of the image data;
extracting image process information representing whether the image data is attained as a result of an image process on the original data;
obtaining selection information representing which of the image data and the original data is used;
convening the image data into vector data in a case where no pointer information is extracted, in a case where the image process information represents that no process has been done, or in a case where the selection information represents use of the image data;
inputting the original data on the basis of the pointer information in a case where the pointer information is extracted, the image process information represents that the process has been done, and the selection information represents use of the original data; and
forming an image on the basis of the vector data or the original data.

12. An image processing method, comprising using a computer to perform the steps of:
extracting, from input image data, pointer information for specifying a storage location of original data of the image data;
obtaining image process information representing whether the image data is attained as a result of an image process on the original data;
selecting which of the image data and the original data is used in a case where the pointer information is extracted and the image process information represents that the image process has been done; and
forming an image based on the image data or the original data.

13. A computer-executable program stored on a computer-readable storage medium, said computer-executable program being executable by a computer so as to control the computer to execute an image processing method, said method comprising the steps of:

inputting image data;

extracting, from the image data, pointer information for specifying a storage location of original data of the image data;

extracting image process information representing whether the image data is attained as a result of an image process on the original data;

obtaining selection information representing which of the image data and the original data is used;

converting the image data into vector data in a case where no pointer information is extracted, in a case where the image process information represents that no process has been done, or in a case where the selection information represents use of the image data;

inputting the original data on the basis of the pointer information in a case where the pointer information is extracted, the image process information represents that the process has been done, and the selection information represents use of the original data; and forming an image on the basis of the vector data or the original data.

14. A computer-readable storage medium storing a computer-executable program, said computer-executable program being executable by a computer so as to control the computer to execute an image processing method, said method comprising the steps of:

inputting image data;

extracting, from the image data, pointer information for specifying a storage location of original data of the image data;

extracting image process information representing whether the image data is attained as a result of an image process on the original data;

obtaining selection information representing which of the image data and the original data is used;

converting the image data into vector data in a case where no pointer information is extracted, in a case where the image process information represents that no process has been done, or in a case where the selection information represents use of the image data;

inputting the original data on the basis of the pointer information in a case where the pointer information is extracted, the image process information represents that the process has been done, and the selection information represents use of the original data; and forming an image on the basis of the vector data or the original data.

15. A computer-executable program stored on a computer-readable storage medium, said computer-executable program being executable by a computer so as to control the computer to execute an image processing method, said method comprising the steps of:

extracting, from input image data, pointer information for specifying a storage location of original data of the image data;

obtaining image process information representing whether the image data is attained as a result of an image process on the original data;

selecting which of the image data and the original data is used in a case where the pointer information is extracted and the image process information represents that the image process has been done; and forming an image based on the image data or the original data.

16. A computer-readable storage medium storing a computer-executable program, said computer-executable program being executable by a computer so as to control the computer to execute an image processing method, said method comprising the steps of:

extracting, from input image data, pointer information for specifying a storage location of original data of the image data;

obtaining image process information representing whether the image data is attained as a result of an image process on the original data;

selecting which of the image data and the original data is used in a case where the pointer information is extracted and the image process information represents that the image process has been done; and forming an image based on the image data or the original data.

17. An image processing apparatus comprising:

an extracting unit, constructed to extract pointer information from input image data to specify a storage location of original data of the input image data;

an obtaining unit, constructed to obtain image process information from the input image data to represent whether the input image data is attained as a result of an image process on the original data;

a selecting unit, constructed to select which of the input image data or the original data is used in a case where the pointer information is extracted and the image process information represents that the image process has been done; and a forming unit, constructed to form an image based on the data selected by said selecting unit.

18. The apparatus according to claim 17, wherein the pointer information is embedded as a two-dimensional code in an image represented by the input image data.

19. The apparatus according to claim 17, wherein the pointer information is embedded as a digital watermark in an image represented by the input image data.

20. The apparatus according to claim 17, wherein said selecting unit comprises a display unit to display the input image data and the original data.

* * * * *